US012729112B1

(12) United States Patent
Al-Sulami et al.

(10) Patent No.: US 12,729,112 B1
(45) Date of Patent: Sep. 8, 2026

(54) PROTONATION APPROACH TO IMPROVE THE GREEN HYDROGEN PRODUCTION USING ALUMINUM ALLOY

(71) Applicant: University of Jeddah, Jeddah (SA)

(72) Inventors: Ahlam Ibrahim Al-Sulami, Jeddah (SA); Aisha Hussain Al-Moubaraki, Jeddah (SA)

(73) Assignee: University of Jeddah, Jeddah (SA)

(*) Notice: Subject to any disclaimer, the term of this patent is extended or adjusted under 35 U.S.C. 154(b) by 0 days.

(21) Appl. No.: 19/275,366

(22) Filed: Jul. 21, 2025

(51) Int. Cl.
*C01B 3/08* (2026.01)
*C22C 21/10* (2006.01)

(52) U.S. Cl.
CPC ................ *C01B 3/08* (2013.01); *C22C 21/10* (2013.01)

(58) Field of Classification Search
CPC ........................................................ C01B 3/08
See application file for complete search history.

(56) References Cited

U.S. PATENT DOCUMENTS

| | | | | |
|---|---|---|---|---|
| 7,722,757 | B1 * | 5/2010 | Miller | C25B 1/02 205/639 |
| 2002/0081235 | A1 * | 6/2002 | Baldwin | B01J 10/007 422/106 |
| 2007/0237994 | A1 * | 10/2007 | Nakai | H01M 8/04216 429/421 |
| 2008/0152584 | A1 * | 6/2008 | Anand | C01B 3/08 423/657 |
| 2023/0220530 | A1 * | 7/2023 | Lorenzino | C22C 21/16 148/552 |

* cited by examiner

*Primary Examiner* — Paul A Wartalowicz
(74) *Attorney, Agent, or Firm* — Pabst Patent Group LLP

(57) ABSTRACT

Described herein are aluminum-based alloy compositions useful for generating hydrogen gas upon contact with water or water containing liquids. The aluminum-based alloys generate hydrogen quickly by reacting with water at room temperature through the formation of galvanic cells. The alloys are mainly composed of aluminum and other metals selected from the group containing chromium (Cr), copper (Cu), iron (Fe), magnesium (Mg), manganese (Mn), silicon (Si), titanium (Ti), zinc (Zn), and/or zirconium (Zr).

14 Claims, 2 Drawing Sheets

PROTONATION APPROACH TO IMPROVE THE GREEN HYDROGEN PRODUCTION USING ALUMINUM ALLOY

FIELD OF THE INVENTION

The invention is generally in the field of alloys, particularly to aluminum alloys and aluminum-based microstructures that are useful for the production of hydrogen gas.

BACKGROUND OF THE INVENTION

The current energy for the basic structures and facilities (e.g. buildings, roads, power supplies) is based on the use of fossil fuels. However, it leads to $CO_2$ emissions, and as a result, contributes to climate change that will negatively impact the environment. However, hydrogen production as a green source of energy is a valuable quality as an environmentally eco-friendly and a qualified alternative energy source. The quantity of the unique electrolysis green synthesis is a potential point for a future application of clean energy. However, the cost is a limitation for a few expected decades to solve the challenge. The long-term objective can be achieved using water and catalysts with up to 21.3 wt. % using water vapor. One source of materials for the generation of hydrogen gas includes hydrides. Among the existing hydrides, $NaBH_4$ has been used and confirmed as the best choice for the hydrogen production application.

Unfortunately, $NaBH_4$ has deep-seated drawbacks. High cost, instability, limited solubility, expensive catalysts source are some limitations and applications of such model, as well as significant challenges with recycling due to the presence of $NaBO_2$ byproduct.

Although the corrosion of Al in water takes place, hydrogen production requires close monitoring in both acidic and basic media. Surface passivation poses the greatest challenge, reducing hydrogen production considerably, changing the experimental conditions such as pH, temperature. Furthermore, the solid nature of the outer layer introduced by surface passivation introduces another important factor to overcome. In the last few years, Al and Al alloys have been used as an alternative approach to generate hydrogen from water. However, the formation of $Al(OH)_3$ inhibits hydrogen evolution and reduces the end time of the production. The Al powder with high electron density and oxidation potential energy has succeeded in overcoming the inhibition limitation by reducing the passivation in the presence of another solution mixture that is able to produce hydrogen (e.g. $NaBH_4$ can produce hydrogen in 100% yields and flow rates up to 2.9 L/min per gram of Al). Nevertheless, the most challenging point is to apply a high pH level (not lower than 12) that is used in different compositions as an aqueous alkaline solution to produce hydrogen with an extension time more than one minute at the end of reaction by using Al and water with improvement in the rates and yields.

Accordingly, there remains a need to develop systems for generating hydrogen gas, particularly in an eco-friendly manner.

Therefore, it is an object of the present inventor to develop improved systems for generating hydrogen gas.

It is also an object of the invention to develop an aluminum-based composition that can generate hydrogen gas in contact with water. Desirably, this aluminum-based composition would be less expensive and easier to manufacture.

SUMMARY OF THE INVENTION

Disclosed herein are aluminum-based alloy compositions useful for generating hydrogen gas upon contact with water or water containing liquids. The alloys are mainly composed of aluminum and other metals selected from the group containing chromium (Cr), copper (Cu), iron (Fe), magnesium (Mg), manganese (Mn), silicon (Si), titanium (Ti), zinc (Zn), and/or zirconium (Zr). The aluminum-based alloy can be in any suitable for generating hydrogen gas. Preferably, the aluminum-based alloy is in the form of powder.

Methods of making and methods of using the aluminum-based alloy compositions are also disclosed herein. The disclosed aluminum-based alloy compositions generate hydrogen quickly by reacting with water at room temperature through the formation of galvanic cells.

DETAILED DESCRIPTION OF THE INVENTION

I. Aluminum Based Alloy Compositions

Figure 1:
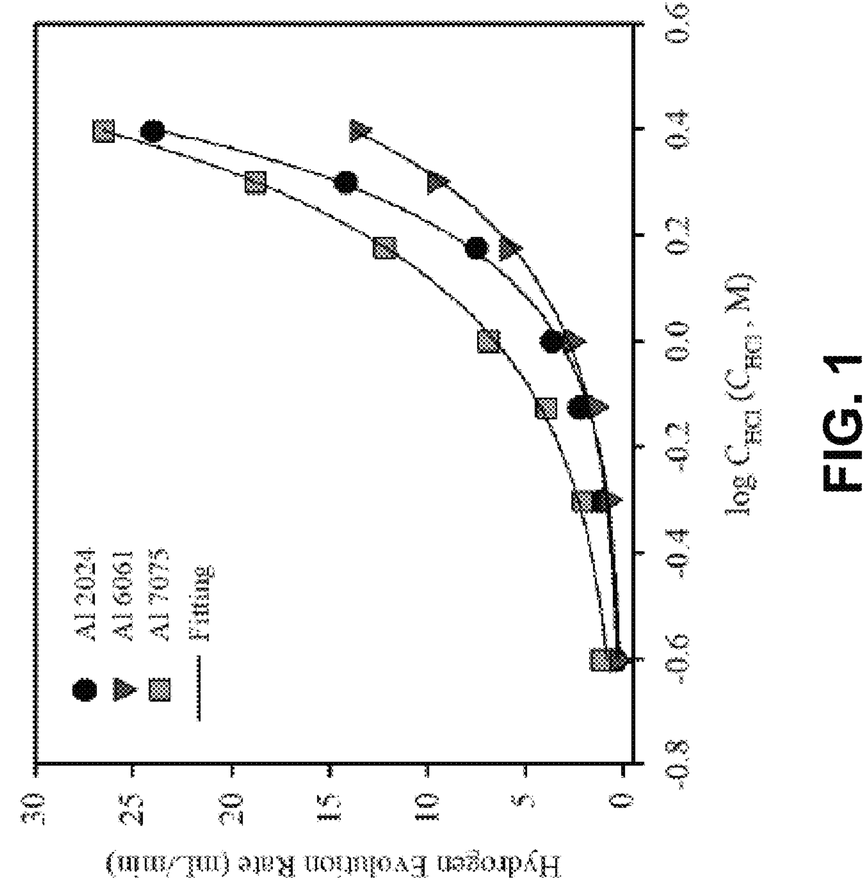
FIG. 1 is a graph showing the variation of $H_2$ evolution rate with logarithmic concentration of HCl solutions for aluminum alloys at 30° C. The data presented FIG. 1 are based on experimental results obtained under controlled laboratory conditions. Each data point represents the average value of three independent measurements to ensure accuracy and reproducibility. The experimental procedure involved immersing aluminum alloy samples in hydrochloric acid solutions of varying concentrations and recording the hydrogen evolution rate at 30° C.

Described herein are aluminum-based alloy compositions. Preferably, the aluminum-based alloy compositions are useful for generating hydrogen gas upon contact with water or water containing liquids. Hydrogen gas production by metal corrosion is one promising alternative to obtaining the gas in an eco-friendly process. Metals and alloys are used to make hydrogen because of their ability to corrode in a variety of conditions, including water, alkaline, and acidic media. Metals-based on-demand hydrogen release could obviate the requirement for hydrogen storage. Aluminum's use in hydrogen production has attracted increasing attention in recent years because its low density and tri-valence state results in a high effective hydrogen content per mass of reactants, and the byproducts have a low environmental impact. Aluminum also has important advantages for its potential wide use as an energy carrier, including its high energy density; the fact that it is the most abundant metal in the earth's crust; and its highly negative standard redox potential (Eo=−1.66 V). These advantages make aluminum, an excellent reducing agent capable of producing hydrogen gas upon contact with aqueous solutions.

Another important consideration is the active area presented by the aluminum structure toward hydrogen formation. Grain boundaries formed in aluminum alloys become corrosion sites. For this reason, most aluminum alloys corrode faster and promote higher hydrogen evolution rates than pure aluminum. Galvanic coupling of the intermetallic particles found in these alloys with the aluminum matrix and the intergranular corrosion along the grain boundaries often lead to pitting which supports the onset of corrosion fatigue and/or cracking.

The aluminum-based alloys are mainly composed of aluminum and other metals selected from the group containing chromium (Cr), copper (Cu), iron (Fe), magnesium (Mg), manganese (Mn), silicon (Si), titanium (Ti), zinc (Zn), and/or zirconium (Zr). The aluminum-based alloy can be in any suitable for generating hydrogen gas. Preferably, the aluminum-based alloy is in the form of powder In some forms, the present composition is in the form of aluminum-based nanostructured alloys for the spontaneous, easy, and rapid generation of hydrogen gas at room or elevated temperature without externally applied energy by contacting the composition, for example in powder form, with water or liquids containing water. Due to their high surface area and increased grain boundary density, nano-structured alloys facilitate more efficient corrosion and higher hydrogen evolution rates at ambient temperature. Their structure also promotes faster galvanic interactions between aluminum and the alloying elements.

A. Metals

The aluminum alloy contains between 90% to 99%, between 85% to 99%, between 80% to 99%, 70% to 99%, 60% to 99%, 50% to 99%, or 40% to 99% atomic aluminum. The aluminum alloy preferably contains between 85% to 99% atomic aluminum.

The aluminum alloy contains between 0.01% to 0.5%, 0.01% to 0.45%, 0.01% to 0.4%, 0.01% to 0.35%, 0.02% to 0.35%, 0.03% to 0.35%, or 0.04% to 0.35% atomic chromium. The aluminum alloy preferably contains between 0.04% to 0.35% atomic chromium.

The aluminum alloy contains between 0.01% to 6.5%, 0.01% to 6.0%, 0.01% to 5.5%, 0.01% to 5.0%, 0.05% to 5.0%, 0.1% to 5.0%, or 0.15% to 4.9% atomic copper. The aluminum alloy preferably contains between 0.15% to 4.9% atomic copper.

The aluminum alloy contains between 0.1% to 2.0%, 0.1% to 1.5%, 0.1% to 1.0%, 0.1% to 0.7%, 0.2% to 0.7%, 0.3% to 0.7%, 0.4% to 0.8%, 0.5% to 0.7% atomic iron. The aluminum alloy preferably contains between 0.5% to 0.7% atomic iron.

The aluminum alloy contains between 0.1% to 4.0%, 0.1% to 3.5%, 0.1% to 3.0%, 0.1% to 2.9%, 0.3% to 2.9%, 0.5% to 2.9%, 0.7% to 2.9%, 0.8% to 2.9% atomic magnesium. The aluminum alloy preferably contains between 0.8% to 2.9% atomic magnesium.

The aluminum alloy contains between 0.01% to 2.5%, 0.01% to 2.0%, 0.01% to 1.5%, 0.01% to 1.0%, 0.05% to 0.9%, 0.1% to 0.9%, or 0.15% to 0.9% atomic manganese. The aluminum alloy preferably contains between 0.15% to 0.9% atomic manganese.

The aluminum alloy contains between 0.01% to 2.5%, 0.01% to 2.0%, 0.01% to 1.5%, 0.01% to 1.0%, 0.1% to 0.8%, 0.2% to 0.8%, 0.3% to 0.8%, or 0.4% to 0.8% atomic silicon. The aluminum alloy preferably contains between 0.4% to 0.8% atomic silicon.

The aluminum alloy contains between 0.01% to 2.5%, 0.01% to 2.0%, 0.01% to 1.5%, 0.01% to 1.0%, 0.01% to 0.5%, 0.05% to 0.2%, 0.1% to 0.2%, or 0.15% to 0.2% atomic titanium. The aluminum alloy preferably contains between 0.15% to 0.2% atomic titanium.

The aluminum alloy contains between 0.01% to 7.5%, 0.01% to 7.0%, 0.01% to 6.5%, 0.01% to 6.1%, 0.05% to 6.1%, 0.1% to 6.1%, 0.15% to 6.1%, 0.2% to 6.1%, or 0.25% to 6.1% atomic zinc. The aluminum alloy preferably contains between 0.25% to 6.1% atomic zinc.

The aluminum alloy optionally contains between 0.01% to 0.45%, 0.01% to 0.4%, 0.01% to 0.35%, 0.01% to 0.3%, 0.05% to 0.3%, 0.1% to 0.3%, 0.15% to 0.3%, or 0.2% to 0.3% atomic zirconium.

B. Exemplary Aluminum Based Alloys

Exemplary aluminum-based alloys encompassed by the instant application are disclosed below. Table 1 shows the chemical composition of exemplary aluminum alloys. Specimens with a diameter of 10 to 15 mm and a length of 40 to 50 mm were cut from the corresponding metal rods.

TABLE 1

Percentage composition of exemplary Al alloys

| Sample | Cr | Cu | Fe | Mg | Mn | Si | Ti | Zn | Zr | Al |
|---|---|---|---|---|---|---|---|---|---|---|
| 7075 | 0.18-0.28 | 1.2-2 | 0.5 | 2.1-2.9 | 0.3 | 0.4 | 0.2 | 5.1-6.1 | 0.25 | Remainder |
| 2024 | 0.1 | 3.8-4.9 | 0.5 | 1.2-1.8 | 0.3-0.9 | 0.5 | 0.15 | — | — | Remainder |
| 6061 | 0.04-0.35 | 0.15-0.4 | 0.7 | 0.8-1.2 | 0.15 | 0.4-0.8 | 0.15 | — | — | Remainder |

II. Methods of Making and Reagents Therefor

Processing techniques that may be used to produce the compositions of the present composition may include, but are not limited to, milling/machining (including ball milling and especially high-speed ball milling), condensation in inert gas, solution precipitation, physical vapor deposition and electrodeposition. Melt spinning forms thin ribbons of material.

Preferably, the aluminum alloys are generated through high-energy ball milling, a solid-state powder processing technique that enables the formation of fine, homogeneous mixtures with enhanced reactivity. In some embodiments, methods such as melt spinning and solution precipitation were also employed to modify the microstructure and hydrogen generation behavior. These techniques allow for precise control of alloy composition, particle size distribution, and surface characteristics, which are critical for promoting effective aluminum-water reactions.

III. Methods of Using

Methods of using the disclosed aluminum-based alloy compositions and/or measuring the volume of hydrogen gas evolved throughout time are described herein. When aluminum is submerged in aqueous solutions, an electrochemical reaction occurs at the metal/electrolyte interface, involving the transfer of charge from different areas of the surface, functioning as an anode and cathode. The metal is oxidized in a dissolution process in the anodic areas:

$$Al \rightarrow Al^{3+} + 3e- \quad (1)$$

At the cathodic areas, dissolved oxygen is diminished, or hydrogen evolved:

$$O_2 + 2H_2O + 4e- \rightarrow 4OH— \quad (2)$$

$$2H^+ + 2e- \rightarrow H_{2\uparrow} \quad (3)$$

Also, there are present chemical reactions that do not involve a charge transfer such as the precipitation of metal hydroxides:

$$Al^{3+} + 3OH^- \rightarrow Al(OH)_3 \quad (4)$$

The oxide film on the aluminum typically forms a barrier for electronic and ionic charges, which protects the metal from oxidation and dissolution. The oxide film can be destroyed in strongly acidic and alkaline solutions (4>pH>9). As a result, both acidic and basic aluminum hydrolysis can be used to generate hydrogen.

A subset of the disclosed work concentrated on controlling the level of pH with the range of acidity lower than 7. Targeting a high production rate with conversion yield of 100% per 0.5 g of Al alloy, the production rate increased was observed to increase and was continuous for 2 h time of applying the experiment conditions.

In some forms, the methods of using the disclosed aluminum alloy compositions and measuring the amount of hydrogen gas generated throughout time involves inserting the aluminum alloy composition in a solution in a vessel. In some forms, the solution is an acidic solution or basic solution. Preferably, the solution is an acidic solution, with a pH between 0 and 7, between 0 and 6, between 0 and 5, between 0 and 4, between 0 and 3, between 0 and 2, between 0 and 1, between 4 and 1, between 4 and 2, or between 4 and 3. In some embodiments, the pH is less than 7, less than 6, less than 5, less than 4, less than 3, less than 2, or less than 1. Preferably, the pH of the solution is less than 4. In some embodiments, the pH is a basic solution, with a pH between 7 and 14, between 8 and 14, between 9 and 14, between 10 and 14, between 11 and 14, between 12 and 14, between 13 and 14, between 9 and 13, between 9 and 12, between 9 and 11, or between 9 and 10. In some embodiments, the pH is greater than 7, greater than 8, greater than 9, greater than 10, greater than 11, greater than 12, greater than 13, or greater than 14. Preferably, a pH greater than 9. In some embodiments, the acidic or basic solution has a concentration range between 0.1 M and 5 M, between 0.1 M and 4.5 M, between 0.1 M and 4.0 M, between 0.1 M and 3.5 M, between 0.1 M and 3.0 M, between 0.1 M and 2.5 M, between 0.15 M and 2.5 M, between 0.2 M and 2.5 M, or between 0.25 M and 2.5 M. Preferably, the solution is a hydrochloric acid solution. The vessel is connected to a calibrated burette filled with water through a connector. In some forms, the connector includes a Mylius type cell. Upon hydrogen generation, the hydrogen gas displaces the water in the calibrated burette, measuring the amount of hydrogen gas generated.

Figure 2:
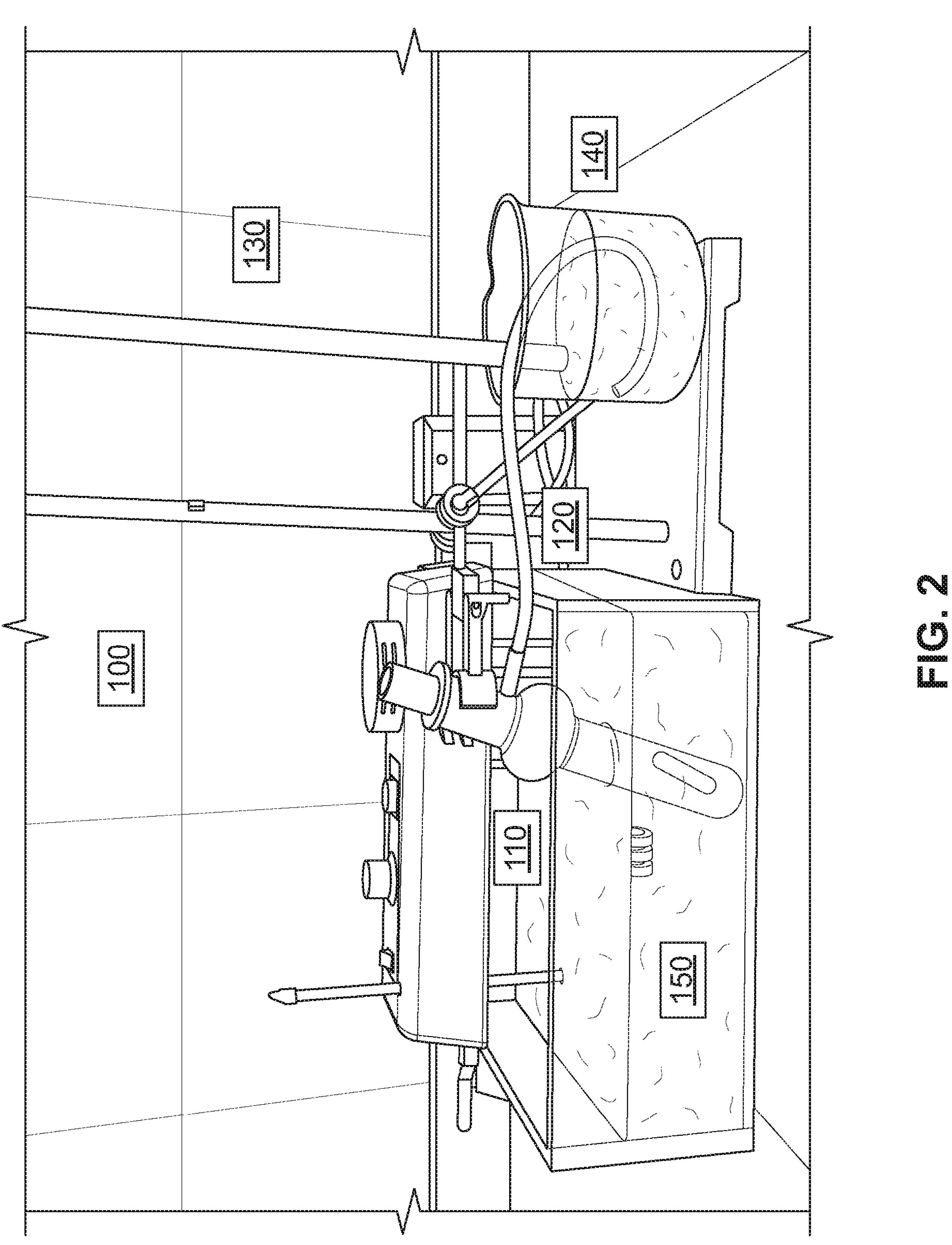
FIG. 2 is a picture depicting the apparatus used for measuring the volume of hydrogen evolved throughout time.

FIG. 2 depicts an exemplary setup for hydrogen evolution (HE) 100. It involves a 100 mL vessel (110) connected by flexible polyethylene tubing (120) to a calibrated glass collecting burette (130). The calibrated tube was filled with water in a 1000 ml beaker that was half full (140). The temperature was maintained consistently during the tests using a thermostatic water bath and steady atmospheric pressure. Weighted aluminum alloy (150) samples were inserted into the solutions, 50 mL of solutions, and were injected into a Mylius type cell. The cell was quickly closed to guarantee that no hydrogen gas escaped throughout the experiment.

A Mylius-type cell is a specialized closed-system apparatus designed to measure gas evolution from solid-liquid reactions with high precision. It features an airtight chamber connected to a gas collection burette via a flexible tube. The cell ensures no hydrogen escapes during the reaction, allowing accurate measurement of gas volume over time. This system is particularly useful for corrosion and hydrogen evolution studies involving reactive metal alloys.

Two exemplary solutions applied are disclosed herein. First, a stock solution of HCl (37% W/V) was prepared using double-distilled water and analytical grade hydrochloric acid medium. By using the proper dilution, a hydrochloric acid medium with concentrations ranging from 0.25 to 2.5 M was created. Second, 2 M of sodium hydroxide solution was made by dissolving a measuring amount of sodium hydroxide. Dilution was used to create a sodium hydroxide medium with concentrations ranging from 0.025 to 1 M.

In some forms, by coupling the compositions of the present composition with fuel cells or a hydrogen internal combustion engine, the compositions will allow effortless generation of energy to operate electronic equipment, transportation vehicles and powered mechanisms, among others. This will be useful for various application products and services. Drive and propulsion systems that require rapid pressurization may also benefit. Thus, the generation of hydrogen from water or water-based reactions with compositions described herein can replace or complement hydrocarbon-based fuels.

The methods, compounds, and compositions herein described are further illustrated in the following examples, which are provided by way of illustration and are not intended to be limiting. It will be appreciated that variations in proportions and alternatives in elements of the components shown will be apparent to those skilled in the art and are within the scope of disclosed forms. All parts or amounts, unless otherwise specified, are by weight.

The disclosed systems and methods of using can be further understood through the following enumerated paragraphs or embodiments.

1. An aluminum-based alloy comprising aluminum, chromium, copper, iron, magnesium, manganese, silicon, titanium, and zinc, optionally further comprising zirconium.

2. The aluminum-based alloy of paragraph 1, wherein the aluminum is present between 90% to 99%, between 85% to 99%, between 80% to 99%, 70% to 99%, 60% to 99%, 50% to 99%, or 40% to 99%.

3. The aluminum-based alloy of any of the preceding paragraphs, wherein chromium is present between 0.01% to 0.5%, 0.01% to 0.45%, 0.01% to 0.4%, 0.01% to 0.35%, 0.02% to 0.35%, 0.03% to 0.35%, or 0.04% to 0.35%.

4. The aluminum-based alloy of any of the preceding paragraphs, wherein the copper is present between 0.01% to 6.5%, 0.01% to 6.0%, 0.01% to 5.5%, 0.01% to 5.0%, 0.05% to 5.0%, 0.1% to 5.0%, or 0.15% to 4.9% atomic copper.

5. The aluminum-based alloy of any of the preceding paragraphs, wherein the iron is present between 0.1% to 2.0%, 0.1% to 1.5%, 0.1% to 1.0%, 0.1% to 0.7%, 0.2% to 0.7%, 0.3% to 0.7%, 0.4% to 0.8%, 0.5% to 0.7% atomic iron.

6. The aluminum-based alloy of any of the preceding paragraphs, wherein the magnesium is present between 0.1% to 4.0%, 0.1% to 3.5%, 0.1% to 3.0%, 0.1% to 2.9%, 0.3% to 2.9%, 0.5% to 2.9%, 0.7% to 2.9%, 0.8% to 2.9% atomic magnesium.

7. The aluminum-based alloy of any of the preceding paragraphs, wherein the manganese is present between 0.01% to 2.5%, 0.01% to 2.0%, 0.01% to 1.5%, 0.01% to 1.0%, 0.05% to 0.9%, 0.1% to 0.9%, or 0.15% to 0.9% atomic manganese.

8. The aluminum-based alloy of any of the preceding paragraphs, wherein the silicon is present between 0.01% to 2.5%, 0.01% to 2.0%, 0.01% to 1.5%, 0.01% to 1.0%, 0.1% to 0.8%, 0.2% to 0.8%, 0.3% to 0.8%, or 0.4% to 0.8% atomic silicon.

9. The aluminum-based alloy of any of the preceding paragraphs, wherein the titanium is present between 0.01% to 2.5%, 0.01% to 2.0%, 0.01% to 1.5%, 0.01% to 1.0%, 0.01% to 0.5%, 0.05% to 0.2%, 0.1% to 0.2%, or 0.15% to 0.2%.

10. The aluminum-based alloy of any of the preceding paragraphs, wherein the zinc is present between 0.01% to 7.5%, 0.01% to 7.0%, 0.01% to 6.5%, 0.01% to 6.1%, 0.05% to 6.1%, 0.1% to 6.1%, 0.15% to 6.1%, 0.2% to 6.1%, or 0.25% to 6.1%.

11. The aluminum-based alloy of any of the preceding paragraphs wherein the zirconium is present between 0.01% to 0.45%, 0.01% to 0.4%, 0.01% to 0.35%, 0.01% to 0.3%, 0.05% to 0.3%, 0.1% to 0.3%, 0.15% to 0.3%, or 0.2% to 0.3%.

12. The aluminum-based alloy of any of the preceding paragraphs, wherein the aluminum is present between 85% to 99%,
the chromium is present between 0.04% to 0.35%,
the copper is present between 0.15% to 4.9%,
the iron is present between 0.5% to 0.7% atomic iron,
the manganese is present between 0.15% to 0.9%,
the titanium is present between 0.15% to 0.2%,
the magnesium is present between 0.8% to 2.9%,
the silicon is present between 0.4% to 0.8%,
the zinc is present between 0.25% to 6.1%, and
optionally, wherein the zirconium is present between 0.2% to 0.3%.

13. A method of generating hydrogen gas, the method comprising:

contacting the aluminum-based alloy of any of the preceding paragraphs in an aqueous solution.

14. The method of paragraph 13, wherein the aqueous solution has an acidic pH or an alkaline pH.

15. The method of any of the preceding paragraphs, wherein the aqueous solution has a pH between 4 and 9, inclusive.

16. The method of any of the preceding paragraphs, wherein the aqueous solution has a pH less than 7, or less than 4.

17. The method of any of the preceding paragraphs, wherein the contacting occurs in a first container operably linked to a second container for storing the hydrogen gas.

The methods, compounds, and compositions herein described are further illustrated in the following examples, which are provided by way of illustration and are not intended to be limiting. It will be appreciated that variations in proportions and alternatives in elements of the components shown will be apparent to those skilled in the art and are within the scope of disclosed forms. All parts or amounts, unless otherwise specified, are by weight.

EXAMPLES

Example 1: Hydrogen Production Using Aluminum Alloys

Materials and Methods

Aluminum alloy specimens tested have a main component of aluminum and nine other elements (chromium, copper, iron, magnesium, manganese, silicon, titanium, and zinc, optionally further containing zirconium) provided by a supplier with contents ranging from the least being Cr with 0.04% to the most being Zn with 6.1%. The nine elements included influence the hydrogen generation reaction in the presence of aluminum element at a content percent of at least 93.9%.

Synthesis of Aluminum Alloys

The composition of the aluminum alloys bar tested are shown in Table 1.

Hydrogen Generation Measurement

Hydrogen generation was measured by immersing 0.5 g of each aluminum alloy sample in various concentrations of HCl at 30° C. for 2 hours. The evolved hydrogen gas was collected using a water displacement method with a calibrated burette, and the volume was recorded periodically.

Each experiment was repeated three times to ensure reproducibility, and average values were reported. At the end of each experiment, the corrosion rate was calculated using a suitable equation based on the recorded hydrogen volumes over time intervals, allowing for an accurate calculation of the material's degradation rate. The rate of mass loss $CR_{WL}$ can be estimated using the difference between the mass of the analyzed sample before and after immersion (ΔW) as well as the end time (t):

$$CR_{WL}=\Delta W/At$$

where ΔW represents the weight loss of aluminum alloy, A is the surface area of the specimen, and t is the end time of each experiment.

Results

FIG. 1 shows the variation of $H_2$ evolution rate with logarithmic concentration of HCl solutions for aluminum alloys at 30° C. Each data point represents the average value of three independent measurements to ensure accuracy and reproducibility.

TABLE 2 hydrogen (mL/0.5 g) collected during immersion of Al alloys in different concentrations of HCl solutions.

| Al alloy | HCl concentration ($C_{HCl}$, M) | $H_2$ gas amount (mL/0.5 g) |
|---|---|---|
| Al 2024 | 0.25 | 37.20 |
| | 0.5 | 132.60 |
| | 0.75 | 263.40 |
| | 1.0 | 429.40 |
| | 1.5 | 893.80 |
| | 2.0 | 1698.80 |
| | 2.5 | 2871.00 |
| Al 6061 | 0.25 | 28.40 |
| | 0.5 | 86.40 |
| | 0.75 | 166.40 |
| | 1.0 | 311.20 |
| | 1.5 | 701.60 |
| | 2.0 | 1150.80 |
| Al7075 | 0.25 | 129.00 |
| | 0.5 | 243.00 |
| | 0.75 | 466.00 |
| | 1.0 | 822.80 |
| | 1.5 | 1459.50 |
| | 2.0 | 2249.40 |
| | 2.5 | 3177.60 |

Table 2 shows the amount of hydrogen (mL/0.5 g) collected during immersion of Al alloys in different concentrations of HCl solutions for 2 hours.

Those skilled in the art will recognize, or be able to ascertain using no more than routine experimentation, many equivalents to the specific embodiments of the invention described herein. Such equivalents are intended to be encompassed by the following claims.

We claim:

1. A method of generating hydrogen gas, the method comprising:

contacting in an aqueous solution an aluminum-based alloy comprising aluminum, chromium, copper, iron, magnesium, manganese, silicon, titanium, and zinc, optionally further comprising zirconium, wherein the aluminum is present between 90% to 99%, 85% to 99%, 80% to 99%, 70% to 99%, 60% to 99%, 50% to 99%, or 40% to 99%, and wherein chromium is present between 0.01% to 0.5%, 0.01% to 0.45%, 0.01% to 0.4%, 0.01% to 0.35%, 0.02% to 0.35%, 0.03% to 0.35%, or 0.04% to 0.35%, to produce the hydrogen gas.

2. The method of claim 1, wherein the aqueous solution has an acidic pH or an alkaline pH.

3. The method of claim 1, wherein the aqueous solution has a pH between 4 and 9, inclusive.

4. The method of claim 1, wherein the aqueous solution has a pH less than 7, or less than 4.

5. The method of claim 1, wherein the contacting occurs in a first container operably linked to a second container for storing the hydrogen gas.

6. The method of claim 1, wherein the copper is present between 0.01% to 6.5%, 0.01% to 6.0%, 0.01% to 5.5%, 0.01% to 5.0%, 0.05% to 5.0%, 0.1% to 5.0%, or 0.15% to 4.9% atomic copper.

7. The method of claim 1, wherein the iron is present between 0.1% to 2.0%, 0.1% to 1.5%, 0.1% to 1.0%, 0.1% to 0.7%, 0.2% to 0.7%, 0.3% to 0.7%, 0.4% to 0.8%, or 0.5% to 0.7% atomic iron.

8. The method of claim 1, wherein the magnesium is present between 0.1% to 4.0%, 0.1% to 3.5%, 0.1% to 3.0%, 0.1% to 2.9%, 0.3% to 2.9%, 0.5% to 2.9%, 0.7% to 2.9%, or 0.8% to 2.9% atomic magnesium.

9. The method of claim 1, wherein the manganese is present between 0.01% to 2.5%, 0.01% to 2.0%, 0.01% to 1.5%, 0.01% to 1.0%, 0.05% to 0.9%, 0.1% to 0.9%, or 0.15% to 0.9% atomic manganese.

10. The method of claim 1, wherein the silicon is present between 0.01% to 2.5%, 0.01% to 2.0%, 0.01% to 1.5%, 0.01% to 1.0%, 0.1% to 0.8%, 0.2% to 0.8%, 0.3% to 0.8%, or 0.4% to 0.8% atomic silicon.

11. The method of claim 1, wherein the titanium is present between 0.01% to 2.5%, 0.01% to 2.0%, 0.01% to 1.5%, 0.01% to 1.0%, 0.01% to 0.5%, 0.05% to 0.2%, 0.1% to 0.2%, or 0.15% to 0.2%.

12. The method of claim 1, wherein the zinc is present between 0.01% to 7.5%, 0.01% to 7.0%, 0.01% to 6.5%, 0.01% to 6.1%, 0.05% to 6.1%, 0.1% to 6.1%, 0.15% to 6.1%, 0.2% to 6.1%, or 0.25% to 6.1%.

13. The method of claim 1, wherein the zirconium is present between 0.01% to 0.45%, 0.01% to 0.4%, 0.01% to 0.35%, 0.01% to 0.3%, 0.05% to 0.3%, 0.1% to 0.3%, 0.15% to 0.3%, or 0.2% to 0.3%.

14. The method of claim 1, wherein the aluminum is present between 85% to 99%, the chromium is present between 0.04% to 0.35%, the copper is present between 0.15% to 4.9%, the iron is present between 0.5% to 0.7% atomic iron, the manganese is present between 0.15% to 0.9%, the titanium is present between 0.15% to 0.2%, the magnesium is present between 0.8% to 2.9%, the silicon is present between 0.4% to 0.8%, the zinc is present between 0.25% to 6.1%, and optionally, wherein the zirconium is present between 0.2% to 0.3%.

* * * * *